United States Patent [19]
Sorensen et al.

[11] 3,935,341
[45] Jan. 27, 1976

[54] METHOD FOR RENDERING WOOD RESISTANT TO FIRE

[75] Inventors: Karl-Otto Sorensen; Jorgen Sondergaard, both of Naesteved, Denmark

[73] Assignee: Kanamark International Limited, Cayman Islands, British W. Indies

[22] Filed: Dec. 7, 1973

[21] Appl. No.: 422,935

Related U.S. Application Data

[63] Continuation of Ser. No. 296,365, Oct. 5, 1972, abandoned, which is a continuation of Ser. No. 99,382, Dec. 18, 1970, abandoned.

[30] Foreign Application Priority Data
Dec. 23, 1969 Denmark ............................ 6836/69

[52] U.S. Cl. ................ 427/317; 427/342; 427/382; 427/393
[51] Int. Cl.² ........................................... B05D 3/02
[58] Field of Search ...... 117/DIG. 3, 148, 136, 137, 117/62, 57; 427/317, 342, 382, 393

[56] References Cited
UNITED STATES PATENTS

| | | | |
|---|---|---|---|
| 949,671 | 2/1910 | Baekeland | 117/148 |
| 2,123,152 | 7/1938 | Rivat | 117/DIG. 3 |
| 2,632,742 | 3/1953 | Eckert | 117/148 X |
| 2,661,341 | 12/1953 | Nason et al. | 117/137 X |
| 3,062,678 | 11/1962 | McCluer | 117/137 X |
| 3,243,140 | 3/1966 | Bliven et al. | 117/148 X |
| 3,320,213 | 5/1967 | Smith | 117/148 X |
| 3,336,959 | 8/1967 | Parks | 117/57 X |
| 3,519,476 | 7/1970 | Bremmer et al. | 117/136 |
| 3,547,687 | 12/1970 | Lewin | 117/148 X |
| 3,701,743 | 10/1972 | Horowitz et al. | 117/148 X |

*Primary Examiner*—Harry J. Gwinnell
*Attorney, Agent, or Firm*—Jones, Tullar & Cooper

[57] ABSTRACT

Wood can be rendered fire resistant by impregnating the wood with a solution of a monomer, such as a phenol, and a fire-inhibiting salt, drying the wood and thereafter treating the wood with a solution of a second monomer, such as formaldehyde, polymerizable with the first monomer. Heating to dryness causes polymerization of the monomers. The fire resistant properties of wood treated this way are not affected by exposure to moisture. Prior to the first impregnation, after the first impregnation and after treatment with the second monomer the wood being treated is dried to a moisture content below about 4%.

4 Claims, 4 Drawing Figures

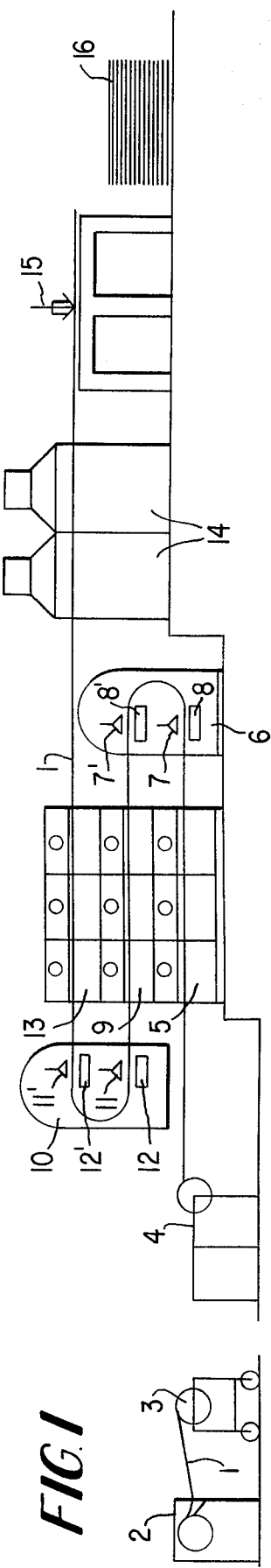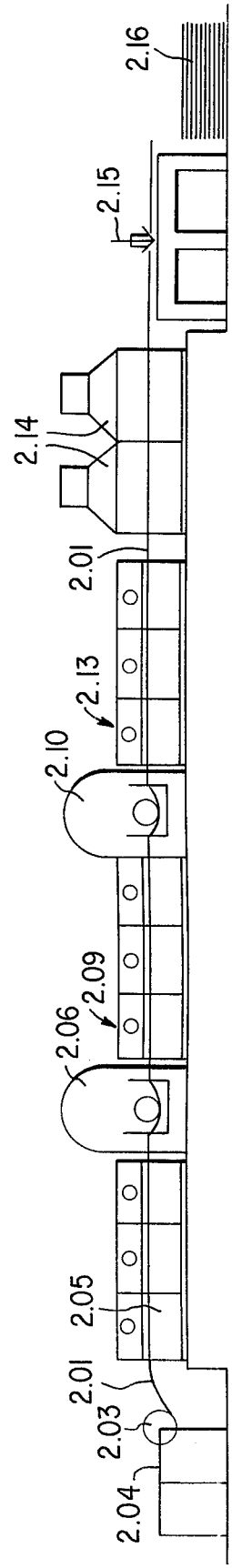

3,935,341

METHOD FOR RENDERING WOOD RESISTANT TO FIRE

This is a continuation of application Ser. No. 296,365, filed Oct. 5, 1972, which, in turn is a continuation of Ser. No. 99,382, filed Dec. 18, 1970, both now abandoned.

BACKGROUND OF THE INVENTION

The present invention relates to a method for the fire-inhibiting impregnation of wood, preferably in the form of thin wood flakes or sheets, e.g. thin veneers or wood chips.

In the course of time, much effort has been directed to solving the problem of imparting fire-inhibiting properties to wood, as well as resistance to the growth of fungi, attack by termites and moisture. Efforts have been made in particular with a view to imparting fire-inhibiting properties to wood. The basic prior art comprises an impregnation of the wood with fire-inhibiting salts that are applied in aqueous solution. For example, ammonium sulphate, sodium sulphate or magnesium sulphate, monoammonium phosphate or diammonium phosphate, borates or the like can be used. The fire-inhibiting or flame-proofing effect of such salts may be based on the fact that their decomposition is endothermic and that on being heated they easily form salts which envelop the inflammable substance, so that same is unable to give off combustible gases and carbonizes without any flames being formed.

Normally, no difficulty is encountered in impregnating wood with the salts mentioned, which easily penetrate into the pores and intermicellar cavities of the wood. On account of the solubility in water of these salts, however, they are rather easily washed out of the wood again, and not only if the wood comes into direct contact with water, for instance with rain, but also if the wood is exposed to moisture in some other way, such as the natural humidity in the atmosphere, condensate or similar moisture occurrences. The result is that even if the impregnated wood in the beginning is resistant to fire, it subsequently becomes just as flammable as nonimpregnated wood. It has been tried to use a large excess of salt, up to 30% by weight, but no significant improvements have been obtained thereby, and, moreover, this is uneconomical. Attempts to mix the salts with other agents, e.g. polyethylene glycol, have also failed to give entirely satisfactory results.

SUMMARY OF THE INVENTION

The object of the invention is to provide a method for the fire-inhibiting impregnation of wood, by which it is achieved that the fire-inhibiting substance is unable to pass out of the wood, which method can be carried out in a continuous manner.

This is achieved by the method according to the invention, which is characterized in that a coating of an insoluble, non-flammable or not easily flammable polymeric material is applied to the external surfaces of the wood and the internal surfaces of the wood in the pores and the intermicellar cavities, which material is formed in situ. Thus, the wood in a dry and preferably hot state is impregnated with a solution of a monomer component and, preferably, a fire-inhibiting compound or salt known per se and heat-dried to remove the solvent. In one embodiment, the wood is treated with a fire-inhibiting compound prior to said impregnation. Thereafter the wood thus treated is treated with a solution of another monomer component and heat-treated to remove the solvent and to form the said polymeric material.

Since the polymeric material formed is insoluble, it will not be washed out by water or other moisture, as are the above-mentioned, fire-inhibiting salts. Moreover, it is present in the wood in an effective state with regard to inhibition of fire, whereas the said salts become effective only by decomposition or melting under the influence of heat from a possible fire. As the polymeric material covers all surfaces, both the external and internal ones, it will, in the event of fires, prevent the generation of combustible gases from the wood. With regard to both duration and effectiveness, the fire-inhibiting effect obtained by the method of this invention surpasses that obtained by known methods.

BRIEF DESCRIPTION OF THE DRAWINGS

FIG. 1 illustrates a conventional peeler for forming a veneer strip which strip is wound on a roll.

FIG. 2 shows one plant for the continuous impregnation of wood strip veneer.

FIG. 3 shows another plant for continuous impregnation; and

Figure 4:
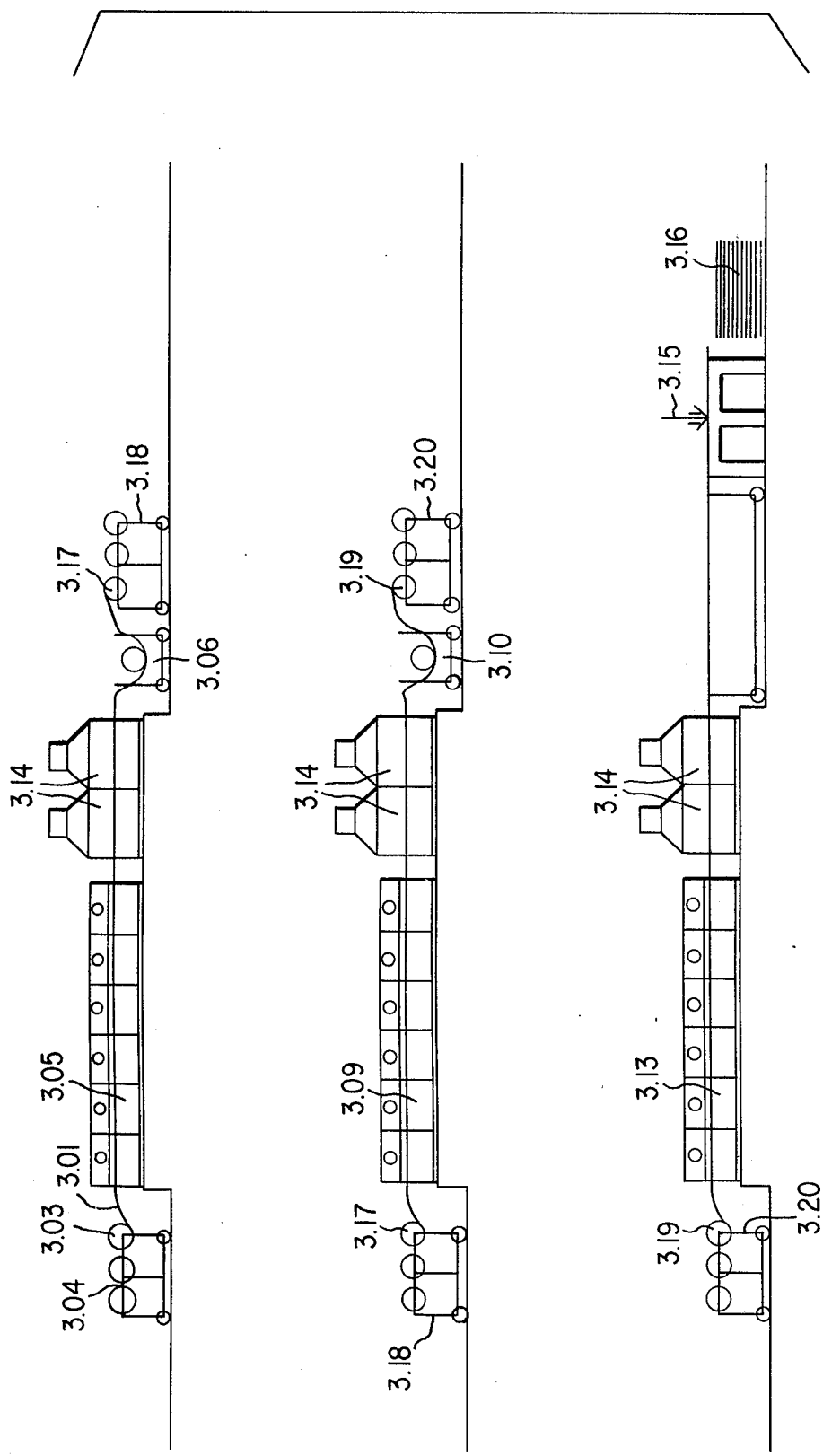
FIG. 4 shows a plant having only one drying oven section for discontinuously performing the method according to the invention.

In each figure a plant is shown with an associated peeler for cutting up wood into veneer in the form of a strip which is wound up onto a roll as well as with an associated cutter, on which the finished treated strip of veneer is cut up into desired lengths.

DESCRIPTION OF THE INVENTION

The first monomer component can, as mentioned above, be applied after or together with a fire-inhibiting compound or salt known per se, which can be one of the salts mentioned above. An increase in the fire-inhibiting effect is thereby obtained, even with small quantities of salt compared to the quantities used in the known methods, and the increased effect is retained since the salt is incorporated in the polymeric material and thus prevented from being washed out. In this regard, it has been found that the first monomer component, which may be referred to as a formaldehyde-reactive monomer, may contain up to about 30% by weight of a fire-inhibiting compound.

Prior to the monomer solutions being applied to the wood in the method according to this invention, the wood is heat-dried to a moisture content of, for instance, about 4%. In order to achieve a thorough impregnation, the monomer solutions may be applied, e.g. sprayed on, under vacuum. However, the monomer solutions are preferably applied at atmospheric pressure. Desirably, the wood is in a hot state as a result of the preceding heat-drying. preferably, the wood has a temperature of about 160°C when impregnated. Thus, the monomer solutions must have a minimum temperature of 80°C. Since the pores in the hot wood are open, and since the amount of air in the pores is very small, as the air expands on account of the high temperature and decreases in density the air is displaced and a subtantially total filling up of liquid in the pores and intermicellar cavities of the wood is achieved.

An expedient embodiment of the method according to the invention consists in using phenol, a dihydroxybenzene, urea or melamine or a mixture thereof, preferably phenol or resorcinol, as the first monomer component and formaldehyde as the second monomer component. While other aldehydes can often be used, formaldehyde has been found particularly suitable in practice. In the condensation process between these monomer components, any fire-inhibiting salt added may in some cases act as a catalyst, and for this purpose such salts as boric acid can be added.

According to the invention, the monomer components are expediently used in aqueous solution. The concentration of, for instance, phenol or resorcinol in the first monomer solution can be varied to a certain extent, the wood being advantageously impregnated with about 50 kilograms of phenol or resorcinol per cubic meter of wood. This can be achieved by a concentration of phenol or resorcinol of between about 7 and about 70% by weight in the solution. A concentration substantially below 7% by weight of phenol or resorcinol results in too small an amount of this monomer component in the wood. A concentration substantially above 70% by weight of phenol or resorcinol results in too large an amount of this monomer component in the wood. Wood containing a large excess of this monomer has a tendency to crack. The amount of the second monomer component should be sufficient to react with the amount of the first monomer component incorporated in the wood, and, in practice, it is preferable to use a small excess of the second monomer component. The formaldehyde preferably used as the second monomer component is provided in an amount of about 15 kilograms, sufficient to react with 50 kilograms of phenol or resorcinol.

However, it is preferred to incorporate about 20 kilograms of formaldehyde per cubic meter of wood, in which about 50 kilograms of phenol or resorcinol have been incorporated. The excess of formaldehyde disappears during the condensation process. If less than all of the phenol or resorcinol is reacted, it will form crystals which promote combustion and thus counteract the intended purpose of the invention.

As mentioned above, the method of this invention is preferably practiced with wood in the form of thin wood flakes or sheets such as thin veneers or wood chips, but it may also be used on other forms, such as sawdust. Such thin wood flakes or sheets, such as veneers, can be of any convenient size and are preferably treated in thicknesses of between 1 and 2.5 millimeters. A complete impregnation of the wood can thereby be obtained. When the treatment has been completed, the wood flakes or sheets can be glued together in a conventional manner. In a preferred embodiment, an adhesive corresponding to the polymeric material incorporated in the wood is used, for producing wood products, such as plywood sheets or other laminated wooden sheets, wood chip sheets or the like, possessing particularly good fire-inhibiting properties. A phenol formaldehyde or resorcinol formaldehyde adhesive is preferably employed, since such adhesives retain their adhesive capacity even after coking. Other properties, such as the resistance to moisture and the growth of fungi, are also significantly improved.

As mentioned above the method according to the invention can be carried out continuously and the invention also relates to a process for continuously carrying out the method dealt with, which process is characterized in that it comprises means for advancing the wood and, successively in the direction of advance, a first drying oven or drying oven section, a first apparatus for applying impregnating liquid, a second drying oven or drying oven section, a second apparatus for applying impregnating liquid, a third drying oven or drying oven section, and a cooling apparatus.

A preferred embodiment of this invention for impregnating veneer in the form of a strip comprises, according to the invention, a drying oven divided into three sections, means for advancing the strip of veneer in one direction through the first drying oven section, in the opposite direction through the third drying oven section, and apparatus for applying impregnating liquid by spraying between the first and second and between the second and third drying oven sections, respectively, as illustrated in FIG. 1.

By means of this invention, an expedient continuous performance in practice of the method dealt with is obtained.

As shown in FIG. 1, a veneer strip 1 is passed from a peeler 2 onto a roll 3. The roll 3 is repositioned onto a rack 4 (FIG. 2) and the veneer strip 1 is passed into a first section 5 of a drying oven divided into three sections. In section 5, the veneer strip is dried at about 160°C to a moisture content of 4% at the most. After having passed out of the first drying oven section, the strip of veneer is passed into a spraying apparatus 6 and through two curtains of liquid produced by conventional spraying heads 7 and 7. The curtains of liquid consist of a solution which can have the following composition:

| | |
|---|---|
| resorcinol | 10 parts by weight |
| borax | 4 parts by weight |
| boric acid | 4 parts by weight |
| water | 82 parts by weight |

As shown in the drawing, the veneer 1 is passed through the curtains of liquid in such a way that it is first sprayed with spraying head 7 on one side and thereafter in a wet state, it is bent around a roller (not shown) and sprayed with spraying head 7' on the other side. The residual liquid which is not absorbed by the veneer, is recovered by conventional collecting equipment 8 and 8'. The temperature of the impregnating liquid is at least 80°C.

After this first impregantion, the strip of veneer is passed through the second section 9 of the drying oven, wherein the temperature is also 160°C and wherein the water is evaporated to a remaining moisture content of about 4%.

The strip of veneer, the external surfaces of which and the internal surfaces of which in the pores and intermicellar cavities are covered with resorcinol at delivery from section 9 of the drying oven, is now passed into spraying apparatus 10, which is similar to spraying apparatus 6, and through two curtains of liquid produced by spraying heads 11 and 11' of the same type as the spraying heads 7 and 7'. The curtains of liquid consist of a solution which can have the following composition:

| | |
|---|---|
| formaldehyde | 4 parts by weight |
| water | 96 parts by weight |

As shown in the drawing, the veneer is passed through the curtains of liquid in such a way that it is first sprayed on one side and thereafter in a wet state, bent around a roller (not shown) and sprayed on the other side. The residual impregnating liquid, which is not absorbed by the veneer, is recovered by conventional collecting equipment 12 and 12''.

After this second impregnation, the strip of veneer is passed into the third section 13 of the drying oven, wherein the temperature is also about 160°C. In the third section 13 the water is evaporated, and resorcinol and formaldehyde are polymerized by condensation to form a polymeric material insoluble in water that envelopes all the wooden substances both externally and internally in the pores and the intermicellar cavities.

After having been passed out of the drying oven section 13, the strip of veneer, which has a moisture content of about 4%, is cooled in a cooling apparatus 14 to normal working temperature, i.e. about 20°C. As previously mentioned the strip of veneer can then be cut by suitable cutter means 15 up into suitable pieces 16 due regard being given to the curing time of the adhesive which is to be employed for manufacturing plywood sheets or other laminated wooden sheets from the treated veneer.

In the plant as shown in FIG. 3 the corresponding parts are denoted and described as in FIG. 2. The strip of veneer 2.01 is treated in a corresponding manner as in the plant accoridng to FIG. 2. However in the plant according to FIG. 3, separate drying ovens 2.05, 2.09 and 2.13 are used, and are arranged in alignment with intermediate apparatus 2.06 and 2.10 for applying the impregnating liquid. In the apparatus 2.06 and 2.10, the strip of veneer is impregnated by immersion into vessels containing impregnating liquid, the strip of veneer in these vessels being passed under a rotatable roller.

In the plant shown in FIG. 4 for the discontinuous carrying out of the method according to the invention, wherein corresponding parts are denoted and described as in FIGS. 2 and 3. 3.05, 3.09 and 3.13 denote the same drying oven used for the first, second and third drying, respectively. Similarly, 3.06 and 3.10 denote movable impregnating apparatus used for successive immersion of the strip of veneer. After the first drying, the strip of veneer 3.01 is subjected to impregnation by immersion into the apparatus 3.06 and is wound up in a wet state on rolls 3.17 on a movable rock 3.18. After the second drying, the strip of veneer is subjected to impregnation by immersion into the apparatus 3.10 and is wound up in a wet state on rolls 3.19 on a movable rock 3.20. The cooling apparatus 3.14 is only used after the third drying. The embodiment shown in FIG. 4 can be used when only one drying oven is available.

With similar plants to those shown in the drawings, it is also possible to treat wood flakes or sheets in forms other than veneer. It is possible, for instance, to treat wood chips, said chips being transported through the plant concerned on a conveyor belt provided with small holes. The conveyor belt provided with holes allows spraying of the impregnating liquid from both sides of the conveyor belt. It is likewise possible to treat sawdust, said sawdust being passed through the plant concerned on non-absorbing glass or a nylon fibre conveyor belt.

We claim:
1. A method for rendering wood resistant to fire which comprises:
heating the wood to dry the same to a mositure content of below about 4%;
impregnating the heated, dried wood, while still hot, with an aqueous solution containing from about 7 to about 70% by weight of a formaldehyde-reactive monomer, said solution having a temperature of at least 80°C.;
heating the formaldehyde-reactive monomer-impregnated wood to dry the same to a moisture content of below about 4%;
impregnating the dry, formaldehyde-reactive monomer-containing wood with a stoichiometric excess of formaldehyde; and
heating the now twice impregnated wood to effect a condensation reaction between the formaldehyde-reactive monomer and the formaldehyde, and to dry the wood to a moisture content of about 4%.

2. A method according to claim 1 in which the formaldehyde is present as an aqueous solution thereof.

3. A method according to claim 1 in which the wood is treated with a fire-inhibiting compound prior to the formaldehyde-reactive monomer impregnation step.

4. A method according to claim 2 in which the formaldehyde-reactive monomer solution contains up to about 30% by weight of a fire-inhibiting compound, and in which the wood contains about 50 kilograms of the formaldehyde-reactive monomer per cubic meter after the first mentioned impregnation step.

* * * * *